United States Patent [19]
Alperovich et al.

[11] Patent Number: 5,940,763
[45] Date of Patent: Aug. 17, 1999

[54] ENHANCED PREEMPTION WITHIN A MOBILE TELECOMMUNICATIONS NETWORK

[75] Inventors: Vladimir Alperovich; Ranjit Bhatia, both of Dallas, Tex.

[73] Assignee: Ericsson, Inc., Triangle Research Park, N.C.

[21] Appl. No.: 08/844,986

[22] Filed: Apr. 23, 1997

[51] Int. Cl.[6] .............................. H04B 7/26; H04Q 7/00
[52] U.S. Cl. ................... 455/450; 455/452; 455/509; 455/511; 370/337; 370/468
[58] Field of Search ................... 455/450, 451, 455/452, 453, 62, 509, 510, 511, 512; 370/465, 468, 337, 347, 329; 375/240, 241, 242, 225

[56] References Cited

U.S. PATENT DOCUMENTS

| | | | |
|---|---|---|---|
| 5,212,684 | 5/1993 | MacNamee et al. | 370/465 |
| 5,299,198 | 3/1994 | Kay et al. | 455/450 |
| 5,327,576 | 7/1994 | Uddenfeldt et al. | 370/347 |
| 5,471,645 | 11/1995 | Felix | 455/62 |
| 5,504,939 | 4/1996 | Mayrand et al. | 455/450 |
| 5,530,917 | 6/1996 | Andersson et al. | 455/450 |
| 5,533,024 | 7/1996 | Owada | 370/468 |
| 5,592,469 | 1/1997 | Szabo | 370/468 |
| 5,729,531 | 3/1998 | Raith et al. | 455/453 |
| 5,757,792 | 5/1998 | Aoki | 370/347 |

*Primary Examiner*—Dwayne D. Bost
*Assistant Examiner*—Quochien Ba Vuong
*Attorney, Agent, or Firm*—Jenkens & Gilchrist

[57] ABSTRACT

A first mobile station within a particular service area is initially allocated with a full-rate traffic channel. When congestion occurs within the serving base station controller (BSC) and no traffic channel is available for further allocation, the full-rate traffic channel previously allocated to the first mobile station is divided into two half-rate channels. The first mobile station is thereafter re-allocated to one of the two half-rate channels by an intra-cell handover or mode modify procedure. The other half-rate traffic channel then becomes available to effectuate a new call connection with a second mobile station and increases the call capacity associated with the serving BSC.

20 Claims, 6 Drawing Sheets

ENHANCED PREEMPTION WITHIN A MOBILE TELECOMMUNICATIONS NETWORK

BACKGROUND OF THE INVENTION

1. Technical Field of the Invention

The present invention relates to a mobile telecommunications network and, in particular, to a preemption method for optimizing channel resource management within such a network.

2. Description of Related Art

A "radio interface" or "air interface" provides the connection between a particular mobile station traveling within a particular cell area and a base transceiver station (BTS) providing radio coverage for that particular cell area. Within both analog and digital communications systems, the number of frequency channels allocated for effectuating air-interfaces with mobile stations traveling within a particular cell area is fixed. Because of this limitation, mobile service providers often employ a number of channel resource management schemes to better utilize or to manage these valuable radio frequency resources.

One such scheme is to bias the granting of channel requests in congested situations. For instance, depending on the state of channel congestion, a channel request for an outgoing call connection towards a wireline directory number is rejected and a channel is instead made available to an incoming call connection towards a registered mobile station. There are several reasons for such a biasing. First, for an incoming call connection, a registered mobile station (turned on mobile station) is more likely to answer the call than a wireline station. Furthermore, the end-to-end circuit connection has almost already been established in the case of an incoming call connection towards a mobile station. For example, a circuit connection from an originating telecommunications exchange serving the calling party subscriber terminal to a mobile switching center (MSC) serving the called party mobile station has already been established leaving only the last leg of the call connection between the serving BTS and the mobile station to be completed.

Another scheme involves forcefully terminating an established call connection with a low priority and reusing the same resource for a higher priority call. This approach is referred to as preemption and is undesirable given the negative impact on the preempted mobile subscriber. Furthermore, not knowing what has happened to the call, the preempted mobile subscriber is more likely to re-establish the call connection further aggravating the congestion situation within the serving telecommunications network.

Currently within a digital communications system, such as the Global System for Mobile (GSM) communication standard based networks, an increase in call capacity within a particular geographic area can be achieved by deploying a number of different channel rates or schemes. For example, instead of using each time slot or channel within a frame to transport data associated with a call connection at a 13 KBit/s rate, each channel is further divided into two or more sub-channels with a lower data rate to effectuate a larger number of call connections. As an illustration, each time slot or channel is sub-divided into two separate sub-channels, each sub-channel utilizing a half-rate channel scheme for transporting data at a 6 KBit/s rate. As a result, eight time-slots within a Time Division Multiple Access (TDMA) frame, for example, are sub-divided into sixteen half-rate sub-channels to effectuate sixteen call connections.

However, due to a lower digital sampling of subscriber speech, the half-rate channel scheme achieves poorer voice quality than the full-rate channel scheme. Accordingly, unless there exists a demand for high call capacity, service providers typically prefer to assign full-rate channels with associated mobile stations to provide better quality speech connections. However, once a channel is assigned using the full-rate channel scheme and the demand in call capacity subsequently increases to a level where demanded call connections cannot be handled, unless one of the above described preemption or preference methods is utilized, an increase in call capacity cannot be achieved. Moreover, as described above, forcefully terminating an existing call connection or barring an outgoing call connection using one of the above described methods is undesirable and inefficient.

Accordingly, there is a need for a mechanism to better manage or utilize existing channel resources without terminating an established call connection within a mobile telecommunications network.

SUMMARY OF THE INVENTION

The present invention discloses a method and system for effectuating air-interfaces with a plurality of mobile stations within a mobile telecommunications network. A first mobile station is initially allocated a full-rate traffic channel. When all traffic channels assigned to a particular cell area associated with said first mobile station are seized and a subsequent call connection request is received from a second mobile station located therein, the full-rate traffic channel previously assigned to the first mobile station is divided into a plurality of sub-channels. Each sub-channel then uses a speech coding scheme with a lower data rate. The first mobile station is then re-allocated to use one of the newly created sub-channels and the second mobile station is similarly allocated to use another one of the sub-channels, thus enabling both mobile stations to effectuate speech connections over the serving mobile telecommunications network.

In one embodiment, the first mobile station is re-allocated to use a sub-channel by performing an intra-cell handover.

In another embodiment, the first mobile station is re-allocated to use a sub-channel by performing a mode modify procedure.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
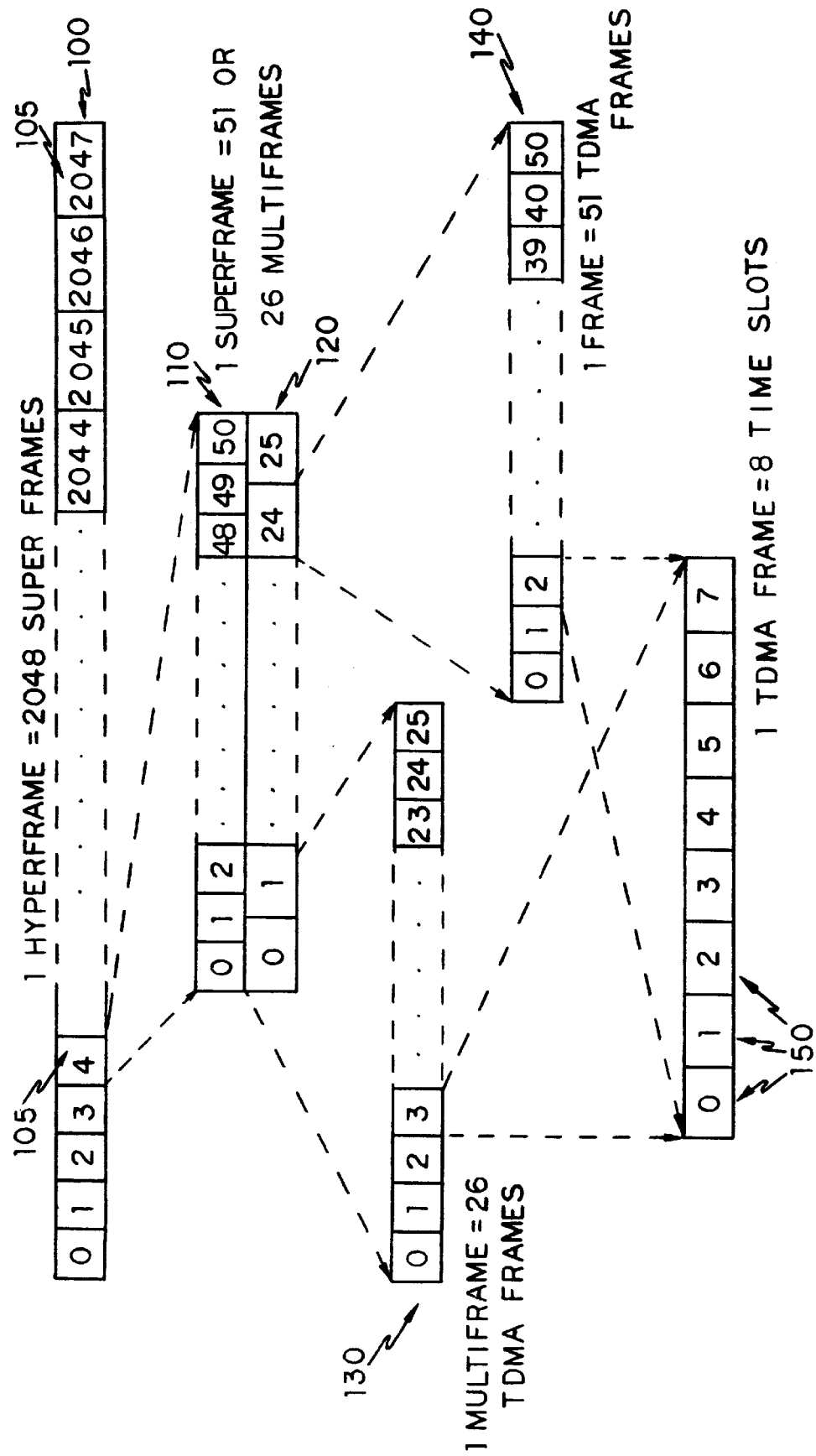
FIG. 1 is a diagrammatic representation of physical channels in accordance with Time Division Multiple Access (TDMA) technology.

Reference is made to FIG. 1 depicting a diagrammatic representation of time-frame structures within a Global System for Mobile (GSM) communications standard. The longest recurrent time period of the structure is called a hyperframe 100 and has the duration of three (3) hours twenty-eight (28) minutes fifty-three (53) seconds and 760 ms. One hyperframe 100 is divided into two thousand forty-eight (2048) superframes 105, each having a duration of 6.12 seconds. The superframe 105 is itself sub-divided into a number of multiframes. Two types of multiframes exist in the GSM standard. First, there is a superframe 105 with fifty-one (51) multiframes 110 each having a duration of 120 ms, and each comprising twenty-six (26) TDMA frames 130. Next, there is a superframe 105 with twenty-six (26) multiframes 120 each having a duration 235.4 ms, and each comprising fifty-one (51) TDMA frames 140. Lastly, each TDMA frame 130 or 140 within a multiframe has eight (8) time slots 150. Each of these eight physical time slots 150 is equivalent to one Time Division Multiple Access (TDMA) channel serving a single mobile station.

A great quantity and variety of information must be transferred between the base transceiver station (BTS) and the mobile station. For example, paging to inform the mobile station of an incoming call has to be performed over one of the time slots. A request for mobile service further needs to be communicated over one of the time slots. Furthermore, the actual voice data must be communicated over the available time slots. Therefore, in order to distinguish one type of information over another, different logical channels have been introduced and assigned to each of the eight physical time slots.

Figure 2:
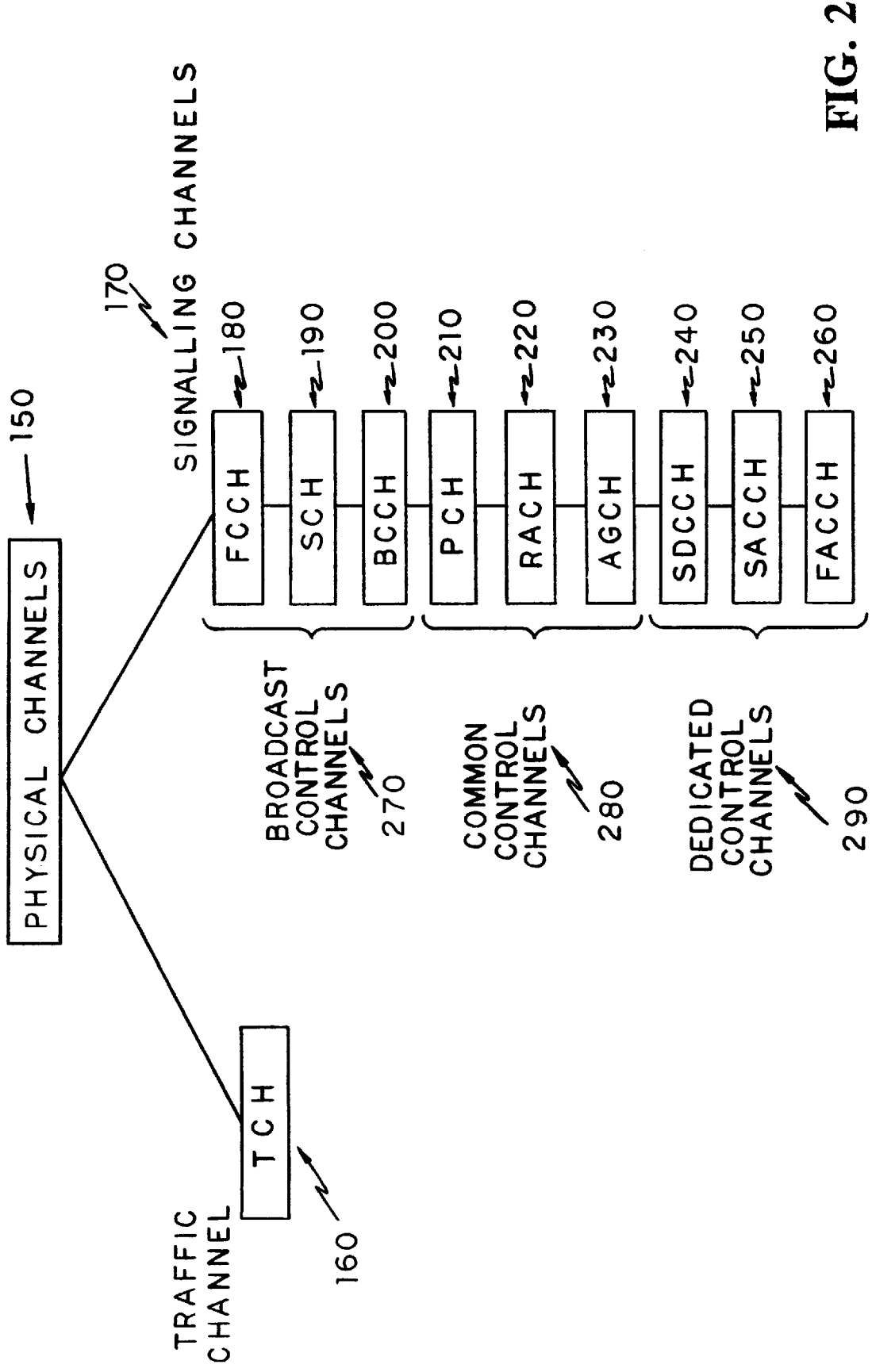
FIG. 2 is a block diagram of different logical channels within a TDMA physical frame in accordance with the Global System for Mobile (GSM) communications standard.

Reference is now made to FIG. 2 illustrating different logical channels within the GSM standard which can be separated into two broad categories: traffic channels (TCH) 160 and signaling channels 170. Traffic channels (TCH) 160 are utilized by a serving base station controller (BSC) to communicate call data (e.g., voice data) with a particular mobile station traveling within its coverage area. On the other hand, signaling channels 170 are utilized by the serving BSC and BTS to communicate other control data necessary to implement the communication of call data with the mobile station.

Signaling channels are further subdivided into three categories: broadcast control channels 270, common control channels 280, and dedicated control channels 290. Each of the above three categories are then still further sub-divided into a number of logical channels for transporting different types of information between the serving BTS and a mobile station.

Broadcast control channels 270 are mainly utilized for flog communicating information from the serving BTS to a particular mobile station traveling within its coverage area (down-link) and include the Frequency Correction Channel (FCCH) 180, Synchronization Channel (SCH) 190, and Broadcast Control Channel (BCCH) 200. The Frequency Correction Channel (FCCH) 180 carries information for frequency correction of the mobile station. The Synchronization Channel (SCH) 190 carries information for frame synchronization of the mobile station and identification of the BTS. Lastly, the Broadcast Control Channel (BCCH) 200 is used to broadcast general system information about the cell to all mobile stations located within its location area. For example, the broadcast system information includes data about the network that the mobile station needs to be able to communicate with the network in an appropriate manner. Such information includes cell description, location area identity, neighbor cell description, etc.

Common control channels 280 include the Paging Channel (PCH) 210, Random Access Channel (RACH) 220, and Access Grant Channel (AGCH) 230. The Paging Channel (PCH) 210 is used on the downlink to page a mobile station. For example, when an incoming call setup request is received by a serving mobile switching center/visitor location register (MSC/VLR), the appropriate BSC currently serving the mobile station is instructed to page the specified mobile station over a PCH. The Random Access Channel (RACH) 220, on the other hand, is used by the mobile station to request allocation of a Stand-alone Dedicated Control Channel (SDCCH) 240 to the BSC. For example, upon detecting the paging message informing the mobile station of an incoming call, the called party mobile station requests a SDCCH from the serving BSC over a RACH. After allocating an idle SDCCH, the BSC utilizes an Access Grant Channel (AGCH) 230 to communicate the identity of the allocated SDCCH to the requesting mobile station.

Dedicated control channels 290 include the Stand-alone Dedicated Control Channel (SDCCH) 240, Slow Associated Control Channel (SACCH) 250, and the Fast Associated Control Channel (FACCH) 260. The Stand-alone Dedicated Control Channel (SDCCH) 240 is used for signaling with a dedicated mobile station. Accordingly, the SDCCH 240 is the channel used for performing location update procedures whenever a mobile station enters a new location area. The SDCCH is also utilized to initiate a call setup and to seize a TCH. The Slow Associated Control Channel (SACCH) 250 is associated with a TCH 160 or an SDCCH 240. The SACCH 250 is a continuous data channel carrying continuous control information, such as measurement reports, timing advance and power order, between the serving BSC and the mobile station. Lastly, the Fast Associated Control Channel (FACCH) 260 is associated with a particular TCH to work in burst stealing mode to replace speech or data traffic with other necessary signaling.

As illustrated above, with nine different types of logical signaling channels and one logical traffic channel occupying the limited physical channels, the eight time slots within a TDMA frame need to be managed efficiently and effectively to provide reliable mobile service to mobile stations traveling within a particular BSC coverage area. Since logical channel assignments to physical channels can not be changed dynamically as demands for each logical channel changes within a serving network, determining the appropriate number of physical time slots to be assigned to each of the logical channels is crucial. This is especially true since congestion in the two of the most frequently utilized logical channels (SDCCH and TCH) results in a failed call connection and lost calls. Even after allocating an appropriate number of physical channels to each logical channel, efficient management of channel resources is further necessary to maximize the potential utilization of available logical channels.

Figure 3:
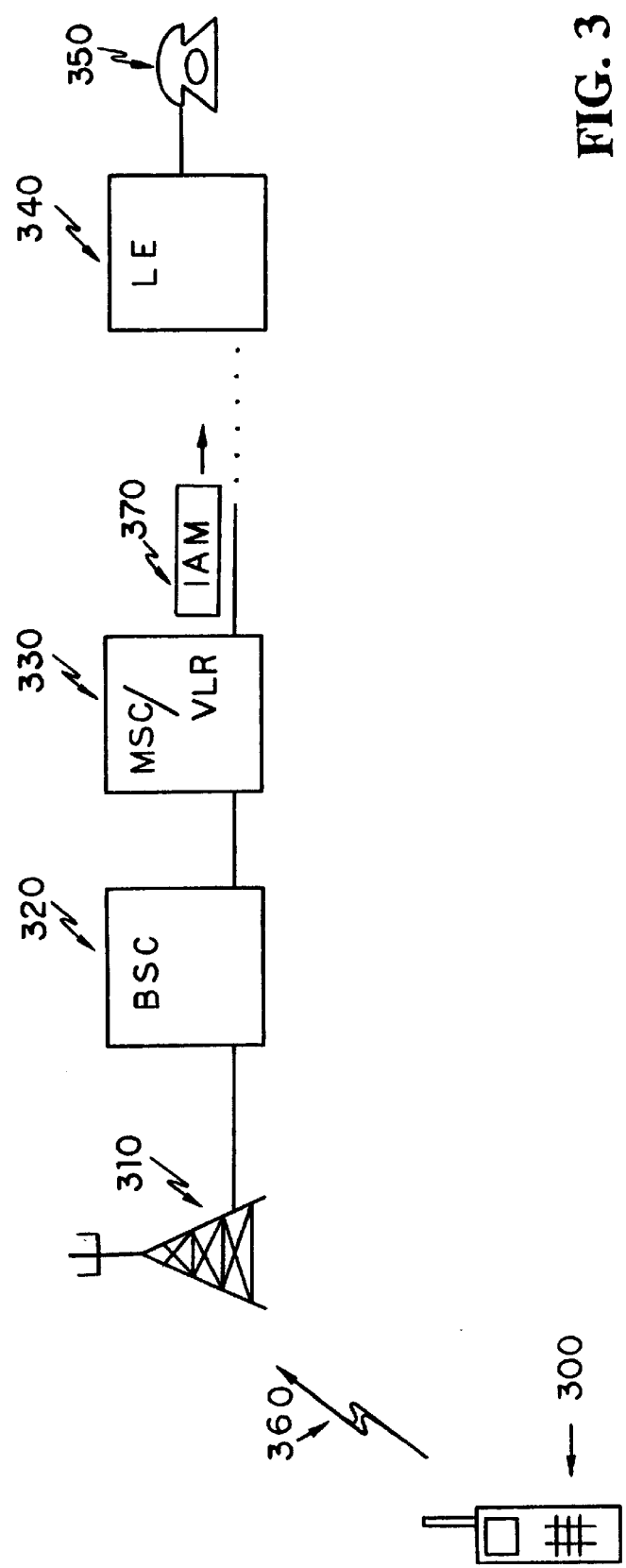
FIG. 3 is a block diagram of a mobile telecommunications network illustrating a mobile station communicating with a serving base station controller (BSC)

FIG. 3 is a block diagram of a mobile telecommunications network illustrating a mobile station 300 originating an outgoing call connection towards a called party subscriber 350. Whenever a mobile station 300 travels into a particular service area, the mobile station 300 registers with a mobile switching center/visitor location register (MSC/VLR) 330 serving that particular area. The serving MSC/VLR 330 then authenticates the mobile station for service and communicates with a home location register (HLR, not shown in FIG. 2) associated with the mobile station 300 for location update and for additional subscriber information. Thereafter, the mobile station 300 requests a channel access to originate an outgoing call connection. The mobile station 300 first transmits a request for a signaling channel, such as a Stand Alone Dedicated Control Channel (SDCCH), over an up-link Random Access Channel (RACH). The transmitted signal 360 over the RACH is received by a base transceiver station 310 (BTS, or also referred to as a base station) serving that particular service area. The serving BTS 310 then forwards the received request to the associated BSC 320. The serving BSC 320 then allocates a SDCCH signal channel and instructs the mobile station 300 to utilize the allocated SDCCH signaling channel over a down-link Access Grant Channel (AGCH). The mobile station 300 receives the identity of the allocated SDCCH signaling channel over the down-link AGCH and then transmits a call setup request over the allocated SDCCH signaling channel. Other necessary signaling procedures are further performed over the allocated SDCCH signaling channel. Such procedures include performing authentication, ciphering equipment identification, sending a called party directory number (B-number), and checking if the associated mobile subscriber has a "barring of outgoing calls" service feature activated.

The transmitted call setup message from the mobile station 300 to the serving MSC/VLR 330 further includes the bearer capability associated with the mobile station 300. Such bearer capability includes, in accordance with the GSM standard, a radio channel requirement, coding standard, transfer mode, information transfer capability, speech version indication, rate adaption, modem type, etc. The information transfer capability data associated with the bearer capability further indicate the type of channel the mobile station is capable of handling. Accordingly, bits seven and six of the information transfer capability field are updated with the following values to indicate the proper channel assignment for the mobile station:

TABLE 1

| Bits | | |
|---|---|---|
| 7 | 6 | Channel Information |
| 0 | 0 | half rate channel |
| 0 | 1 | full rate channel |
| 1 | 0 | dual rate/half rate preferred |
| 1 | 1 | dual rate/full rate preferred |

As a result, depending on the value indicated by bits seven and six of the information transfer capability field of the bearer capability data transmitted by the mobile station 300, the serving MSC/VLR 330 is able to ascertain what type of channel configuration the mobile station 300 is capable of handling. For a dual mode mobile station, the serving MSC/VLR 330 and the BSC 320 attempts to accommodate the mobile station 300 by allocating a preferred channel configuration. As an illustration, when a mobile station with dual rate capability with full rate preference registers, the serving mobile telecommunications network attempts, if possible, to allocate a full rate TCH to the requesting mobile station.

After performing all of the necessary subscriber procedures over the SDCCH signaling channel, the serving MSC/VLR 330 then instructs the serving BSC associated with that particular service area to allocate a determined traffic channel (TCH). If available, the BSC 320 allocates a free TCH and further instructs the BTS 310 and the mobile station 300 to activate and to tune to the allocated TCH 360. For a dual mode mobile station, if the preferred channel is not available, the serving BSC 320 attempts to allocate the other type of channel to the mobile station. If both types of channels are unavailable, a congestion exists within the channel utilization and the mobile station is unable to effectuate an outgoing call connection until an traffic channel is released by an existing call connection.

If a traffic channel has been allocated by the serving mobile telecommunications network, the serving MSC/VLR 330 further transmits a call setup signal in accordance with, for example, a Signaling System No. 7 (SS7) telecommunications standard towards a local exchange 340 serving the indicated called party directory number. As an illustration, a call setup signal 370, such as an Integrated Service Digital Network User Part (ISUP) based Initial Address Message (IAM) signal, specifying the mobile station as a calling party subscriber and a wireline terminal 350 as a called party subscriber is transmitted by the serving MSC/VLR 330 over the connected SS7 telecommunications network. A call connection between the mobile station 300 and the wireline terminal 350 is accordingly effectuated.

It is in connection with this outgoing call connection originated by a mobile station that the preferred embodiments of the present invention will be described. However, as the system and method of the present invention are applicable for any request for a traffic channel including an incoming call connection terminating toward an associated mobile station within a particular service area, it will be understood that the description of the present invention in the context of outgoing call connection procedures provided herein is by way of explanation of the invention rather than of limitation of the scope of the invention.

Figure 4:
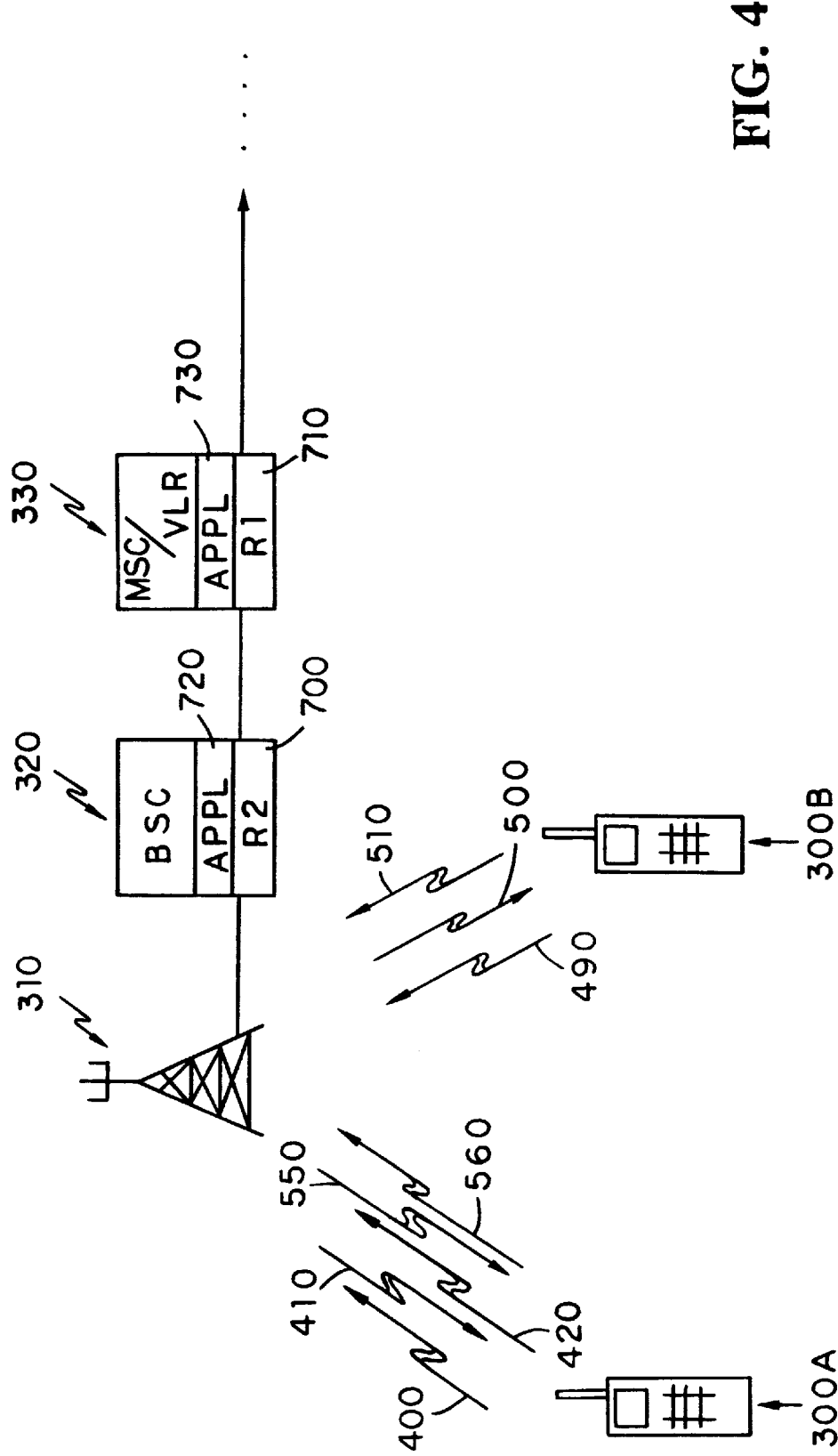
FIG. 4 is a block diagram of a mobile telecommunications network illustrating the management of traffic channels in accordance with the teachings of the present invention.
Figure 5:
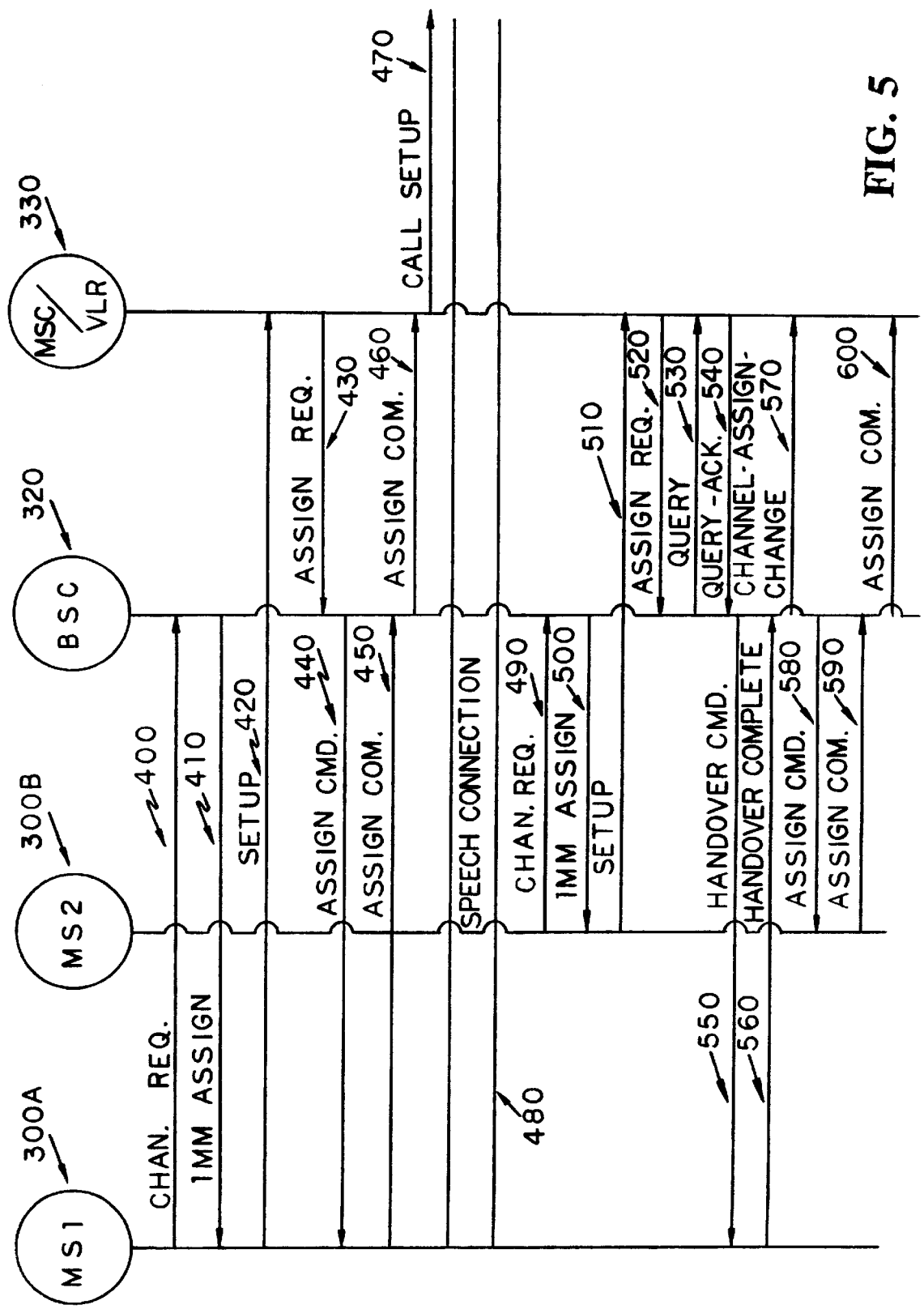
FIG. 5 is a signal sequence chart illustrating the signals communicated in order to manage associated traffic channels in accordance with the teachings of the present invention.

Reference is now made to both FIGS. 4 and 5 illustrating the management of traffic channels in accordance with the teachings of the present invention. A first mobile station 300A attempts to originate an outgoing call connection by requesting a signaling channel, as fully described above, by transmitting a channel request 400 over an available RACH. The transmitted channel request 400 is forwarded to the serving BSC 320 via a BTS 310. The BSC 320 then allocates a SDCCH signaling channel and informs the first mobile station 300A of the assigned signaling channel via immediate assign signal 410. Using the assigned SDCCH signaling channel, the first mobile station 300A then transmits a call setup signal 420 towards the serving MSC/VLR 330. The transmitted setup signal further includes the information transfer capability data indicating the type of channel the first mobile station 300A is capable of communicating therewith. The serving MSC/VLR 330 then instructs the serving BSC 320 to allocate a free TCH by transmitting an assignment request signal 430 thereto. In case the first mobile station is a dual mode mobile station capable of handling both half rate and full rate communications, the BSC 320 allocates a free full rate traffic channel to the requesting mobile station 300A. The BSC 320 then instructs the BTS 310 and the first mobile station 300A of the allocated TCH channel by an assignment command signal 440. The first mobile station then acknowledges the assignment by transmitting an assignment completed signal 450 to the serving BSC 320. The serving BSC 320 then reports back to the serving MSC/VLR 330 by further transmitting yet another assignment completed signal 460 thereto. The transmitted signal includes the type of channel assigned to the first mobile station 300A. A first application module associated with the serving MSC/VLR 330 then stores data identifying the first mobile station 300A and the type of channel allocated therewith at an associated first register (R1) 710. The first register (R1) 710 further stores data indicating the current location associated with the first mobile station. Such location data include a cell global identity (CGI), base station identity code (BSIC), or location area identity (LAI) associated with the serving BTS 310 or the BSC 320. Utilizing the bearer capability data received over the SDCCH, the first register (R1) 710 also stores data indicating the channel configuration(s) the mobile station is capable of handling. The serving MSC/VLR 330 thereafter transmits a call setup signal, such as an initial address message (IAM), over the connected SS7 telecommunications network to effectuate a circuit connection with the specified called party subscriber terminal. As a result, a speech connection 480 is established between the first mobile station 300A and the called party subscriber terminal.

A second mobile station 300B with dual mode capability being served by the same BSC 320 thereafter similarly attempts to originate an outgoing call connection by requesting a signaling channel. In a similar manner as described above, the second mobile station 300B transmits a channel request signal 490 over a RACH. The serving BSC 320 then assigns a signaling channel, such as a SDCCH, and communicates the assignment to the second mobile station via an immediate assignment signal 500. Utilizing the allocated SDCCH signaling channel, the second mobile station 300B then attempts an outgoing call connection by transmitting a setup signal 510 to the serving MSC/VLR 330. The serving MSC/VLR 330 then requests the associated BSC 320 to allocate a free TCH to the second mobile station 300B by transmitting an assignment request signal 520 thereto. By evaluating an associated second register (R2) 700 keeping track of the available channel resources, the BSC 320 then determines that all associated TCHs are already seized and no idle TCH can be allocated for the requesting second mobile station. In accordance with the teachings of the present invention, instead of refusing the call setup request in a conventional manner, a second application module 720 associated with the serving BSC 320 then transmits a query signal 530 to the serving MSC/VLR 330. The transmitted query signal 530 requests the serving MSC/VLR 330 to identify a mobile station currently utilizing a full-rate TCH channel within the current service area. The first application module 730 associated with the serving MSC/VLR 330 then evaluates the associated first register (R1) 710 to identify a mobile station currently located within the same service area and utilizing a full-rate TCH channel. For example, by reviewing the cell global identity (CGI) stored and associated with the first mobile station 300A, the first application module 730 is able to determine that the first mobile station 300A is currently traveling within the same service area as the second mobile station 300B. Furthermore, by reviewing the data indicating the type of channel previously allocated to the first mobile station 300A, the first application module 730 is able to ascertain that the first mobile station 300A is currently utilizing a full-rate traffic channel. The first application module 730 further reviews the associated bearer capability data to ascertain whether this particular mobile station is capable of communicating using a lower data rate. In accordance with the teachings of the present invention, data specifying the first mobile station 300A and the allocated full-rate traffic channel are then communicated to the requesting BSC 320 via a query acknowledgment signal 540.

The identified full-rate traffic channel is then divided into a plurality of sub-channels. As an illustration, the full-rate channel is divided into two half-rate channels. The first mobile station 300A currently utilizing the identified full-rate traffic channel is then re-allocated to one of the two newly created half-rate channels. The other half-rate channel is then allocated to the requesting second mobile station 300B to enable both mobile stations to effectuate call connections with the serving mobile telecommunications network in accordance with the teachings of the present invention.

In one embodiment, the serving BSC 320 performs an intra-cell handover to switch the first mobile station 300A from the already assigned full-rate traffic channel to a newly created half-rate traffic channel within the same cell. The intra-cell handover is conventionally utilized, for example, to re-allocate a mobile station to a different traffic channel in case the channel quality currently associated with an existing traffic channel is unacceptable.

Accordingly, after dividing or "splitting" the identified full-rate traffic channel into two half-rate channels or sub-channels, the serving BSC 320 instructs the first mobile station 300A to switch to one of the newly created half-rate channels by transmitting a handover command signal 550. The transmitted handover command signal 550 further instructs the first mobile station 300A to communicate using a half-rate coding scheme thereafter. The first mobile station 300A, not knowing why it is being switched to a new channel, switches to the newly allocated half-rate channel. The first mobile station 300A then confirms the handover instruction by transmitting a handover complete signal 560 to the serving BSC 320. The serving BSC 320 then communicates the new channel assignment for the first mobile station to the serving MSC/VLR 330 via a channel assignment change signal 570. The data stored at the first register (R1) associated with the serving MSC/VLR 330 are then updated to reflect the changed channel assignment for the first mobile station 300A. As a result, the first mobile station 300A is indicated to be associated with a half-rate channel.

The serving BSC 320 further instructs the requesting second mobile station 300B to utilize the other half-rate traffic channel by a conventional assignment command signal 580. The second mobile station 300B acknowledges the channel assignment by transmitting an assignment complete signal 590 to the serving BSC 320. The serving BSC 320, in turn, transmits yet another assignment complete signal 600 informing the serving MSC/VLR 330 of the half-rate channel assignment to the second mobile station 300B. The first register (R1) 710 is updated accordingly to reflect the same.

As an alternative to the above handover procedure for re-allocating the first mobile station 300A to the newly created half-rate channel, the serving BSC 320 instead performs a mode modify procedure to switch the first mobile station 300A from the full-rate channel to the half-rate channel. The mode modify procedure is conventionally used to modify the mode of communication between an associated mobile station and the serving mobile telecommunications network. For example, switching from data communication to speech communication is effectuated by the mode modify procedure. In accordance with the teaching of the present invention, the serving BSC 320 triggers the reconfiguration of the BTS by sending a mode modify request to the BTS 310. Following the reception of this message, the serving BTS 310 modifies its coding and decoding algorithms from the full-rate to the half-rate and further switches from the full-rate channel to the indicated half-rate channel. After the reconfiguration has been accomplished, the serving BTS 310 answers the serving BSC 320 by a mode modify acknowledge message.

In parallel, the BSC 320 further triggers the reconfiguration of the first mobile station 300A by transmitting a channel mode modify message containing the new mode to be applied over the associated air-interface. The first mobile station accordingly also changes from the full-rate to the indicated half-rate. The indicated half-rate channel is further utilized for subsequent communication therebetween. As a result, the first mobile station 300A has been re-allocated to the new half-rate channel.

Another method for performing a mode modify procedure is to transmit a conventional assignment command signal to a mobile station currently utilizing an existing traffic channel. After receiving a new assignment command signal from the serving BSC, the mobile station assumes that the serving mobile network is ordering the mobile station to perform a transfer of channel assignment from the existing traffic channel to a newly indicated channel and accordingly changes its settings. Thereafter, the mobile station starts transmission and reception according to the half-rate transmission mode indicated in the assignment command signal. The mobile station further acknowledges the channel transfer instruction by sending an assignment complete signal back to the serving BSC.

Figure 6:
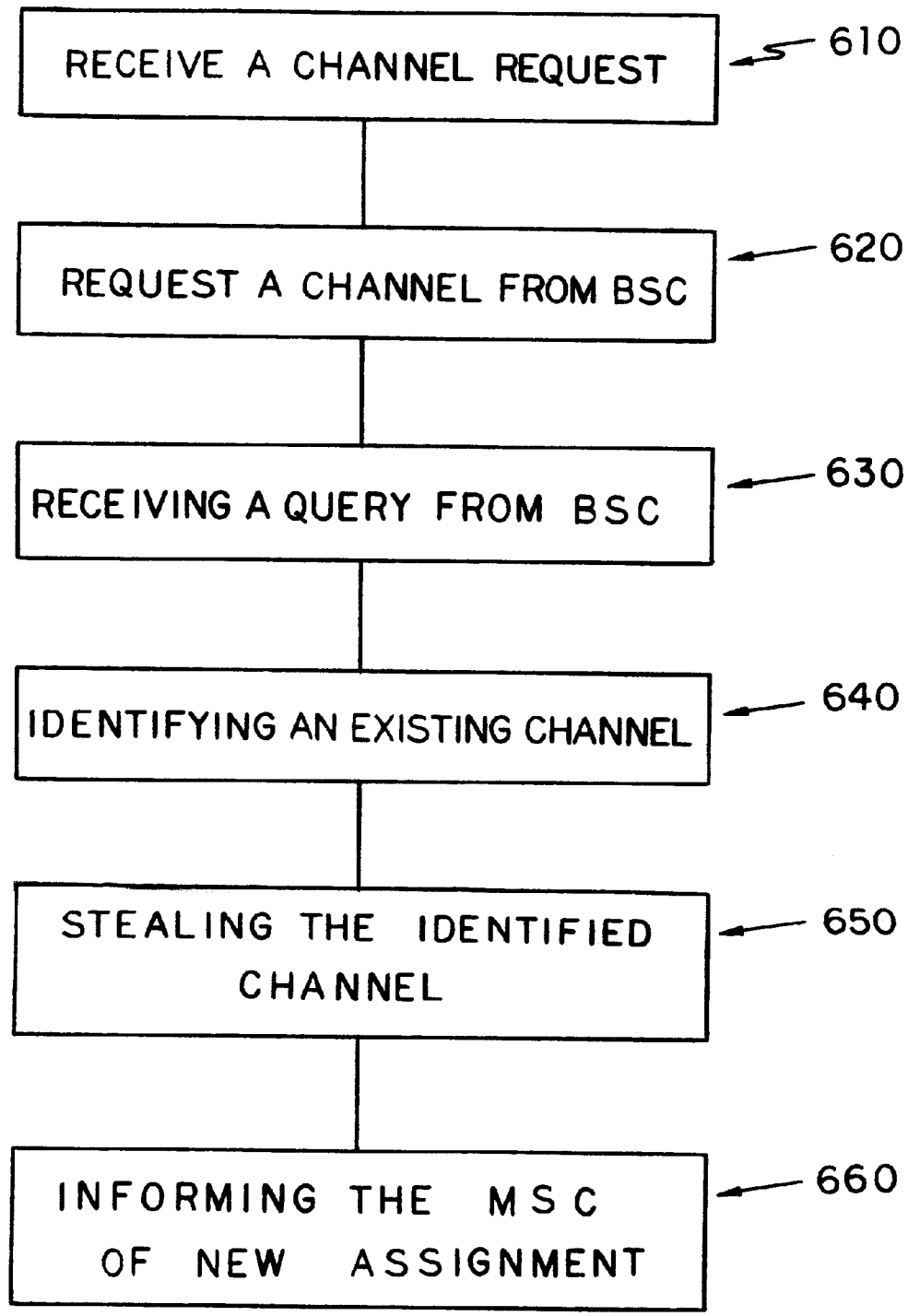
FIG. 6 is a flowchart illustrating the steps performed by a serving mobile telecommunications network to increase the call capacity within a particular cell area.

Reference is now made to FIG. 6 illustrating the general steps performed by a serving mobile telecommunications network to increase the call capacity within a particular cell area in accordance with the teachings of the present invention. An MSC/VLR serving a particular mobile station initially receives a request to allocate a traffic channel (TCH) for the mobile station at step 610. Such a request made be associated with an incoming call connection after the mobile station has responded to paging or with an outgoing call connection being originated by the mobile station itself. Since a particular MSC/VLR, for example, may be associated with a plurality of BSCs serving a plurality of service areas, the serving MSC/VLR first identifies the relevant BSC. The serving MSC/VLR then instructs the identified BSC to allocate a full traffic channel for the mobile station at step 620. The allocated traffic channels associated with the serving BSC, however, are already all occupied and no traffic channel is available for the requesting mobile station. As a result, the serving MSC/VLR receives a query from the serving BSC requesting the MSC/VLR to identify another mobile station currently effectuating a call connection using a full-rate traffic channel within the same geographic area and capable of communicating in dual mode at step 630. Alternatively, a failure return signal from the BSC, for example, would inform the serving MSC of such a request. The serving MSC/VLR then searches the data stored at an associated register and identifies a particular mobile station currently effectuating an air-interface utilizing a full-rate traffic channel at step 640. The identified mobile station and the full-rate channel are then communicated back to the serving BSC. The serving BSC then "steals" a half channel from the already allocated full-rate channel as fully described above, and allocates the freed or preempted half-rate channel to the requesting mobile station at step 650. The new channel allocation for both mobile stations are then communicated to the serving MSC/VLR at step 660.

Even though the storing and maintenance of data indicating the channel assignments and locations associated with associated mobile stations are performed within a serving MSC/VLR, such an application module and register may easily be associated with a serving base station controller (BSC) or other external nodes associated with the serving BSC, and it will be understood that the description of the present invention in the context of the query performed between the serving BSC and the MSC/VLR provided herein is by way of explanation of the invention rather than of limitation of the scope of the invention.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for effectuating an air-interface with a first mobile station within a mobile telecommunications network, wherein said first mobile station and said mobile telecommunications network are capable of communicating data in dual mode including a first speech coding scheme and a second speech coding scheme, said second channel code scheme associated with a lower data load rate than said first channel coding scheme, said method comprising the steps of:

receiving a request associated with said first mobile station to allocate a radio channel;

determining that all associated radio channels are current busy;

identifying a second mobile station currently assigned with a radio channel utilizing said first speech coding scheme;

dividing said radio channel assigned with said identified second mobile station into a plurality of sub-channels;

allocating said second mobile station with a first sub-channel from said plurality of sub-channels using said second speech coding scheme; and allocating said first mobile station with a second sub-channel from said plurality of sub-channels using said second speech coding scheme.

2. The method of claim 1 wherein said radio channel using said first speech coding scheme includes a full-rate channel.

3. The method of claim 1 wherein said radio sub-channel using said second speech coding scheme includes a half-rate channel.

4. The method of claim 1 wherein said radio channel is divided into two half-rate channels.

5. The method of claim 1 wherein said step of identifying said second mobile station currently assigned with said radio channel utilizing said first speech coding scheme further comprises the steps of:

querying an associated mobile switching center (MSC) by a base station controller (BSC) serving said first mobile station, said step of querying requesting said MSC to identify said second mobile station utilizing said first speech coding scheme;

identifying said second mobile station currently traveling within a cell area associated with said first mobile station and allocated a radio channel utilizing said first speech coding scheme; and communicating said identified radio channel to said BSC.

6. The method of claim 1 wherein said step of allocating said second mobile station with said first sub-channel comprises the step of performing an intra-cell handover of said second mobile station from said radio channel to said first sub-channel.

7. The method of claim 1 wherein said step of allocating said second mobile station with said first sub-channel comprises the step of performing a mode modify procedure.

8. The method of claim 1 wherein said radio channel comprises a traffic channel (TCH).

9. A system for managing radio channel resources within a mobile telecommunications network, said mobile telecommunications network capable of communicating data with a plurality of mobile stations registered within a particular cell area using a first speech coding scheme and a second speech coding scheme, said second speech coding scheme associated with a lower data load rate than said first speech coding scheme, comprising:

- a base station controller providing radio coverage for said cell area, said cell area associated with a plurality of radio channels;
- a mobile switching center associated with said base station controller for providing mobile service to said plurality of mobile stations;
- a register associated with said mobile switching center for storing data identifying said plurality of mobile stations currently registered within said cell area, said register further storing speech coding scheme utilized by each of said mobile stations;
- an application module associated with said mobile switching center for identifying a first mobile station within said plurality of mobile stations allocated with a radio channel utilizing said first speech coding scheme; and
- an application module associated with said base station controller for dividing said radio channel previously allocated to said first mobile station into a plurality of sub-channels and for allocating one of said sub-channels to said first mobile station and allocating another one of said sub-channels to a second mobile station requesting a radio channel within said cell area in case all of said plurality of radio channels associated with said cell area are congested.

10. The system of claim 9 wherein said radio channel utilizing said first speech coding scheme comprises a full-rate channel.

11. The system of claim 9 wherein said plurality of sub-channels utilizing said second speech coding scheme comprise half-rate channels.

12. The system of claim 9 wherein said application module associated with said base station controller for allocating said first mobile station to said one of said sub-channels comprises means for performing an intra-cell handover.

13. The system of claim 9 wherein said application module associated with said base station controller for allocating said first mobile station to said one of said sub-channels comprises means for performing a mode modifying procedure.

14. The system of claim 9 wherein said radio channel resources comprise a plurality of traffic channels (TCH) for effectuating call connections.

15. A method for providing air-interfaces with a plurality of mobile stations traveling within a particular cell area associated with a mobile telecommunications network, said mobile telecommunications network capable of communicating data using a first speech coding scheme and a second speech coding scheme, wherein said second speech coding scheme has a lower data load rate than said first speech coding scheme, said method comprising the steps of:

- receiving a request to effectuate a call connection with a first mobile station;
- allocating a particular radio channel utilizing said first speech coding scheme to said first mobile station;
- receiving a request to effectuate a call connection with a second mobile station;
- dividing said radio channel previously allocated to said first mobile station into a plurality of sub-channels, each of said sub-channels utilizing said second speech coding scheme; and
- reallocating one of said sub-channels to said first mobile station; and
- allocating another one of said sub-channels to said second mobile station.

16. The method of claim 15 wherein said radio channel comprises a full-rate traffic channel (TCH).

17. The method of claim 15 wherein said radio sub-channels comprise half-rate traffic channels (TCH).

18. The method of claim 15 wherein said step of re-allocating said first mobile station comprises the step of performing an intra-cell handover.

19. The method of claim 15 wherein said step of re-allocating said first mobile station comprises the step of performing a mode modify procedure.

20. The method of claim 15 wherein said radio channels are formatted in accordance with a Time Division Multiple Access (TDMA) technology.

* * * * *

UNITED STATES PATENT AND TRADEMARK OFFICE
CERTIFICATE OF CORRECTION

PATENT NO. : 5,940,763
DATED : August 17, 1999
INVENTOR(S) : Vladmir Alperovich et al.

It is certified that error appears in the above-identified patent and that said Letters Patent is hereby corrected as shown below:

<u>Column 3,</u>
Line 53, delete "flog"

<u>Column 12,</u>
Line 18, after "mobile station" add -- capable of communicating data using said first speech coding scheme and said second speech coding scheme and storing information transfer capability in a register --

Signed and Sealed this

Nineteenth Day of February, 2002

Attest:

Attesting Officer

JAMES E. ROGAN
*Director of the United States Patent and Trademark Office*